Dec. 29, 1936.    D. OOSTERHOF ET AL    2,065,728
PROCESS FOR REMOVING LOW MOLECULAR GLYCERIDES
FROM POLYMERIZED OILS BY DISTILLATION
Filed Dec. 16, 1933
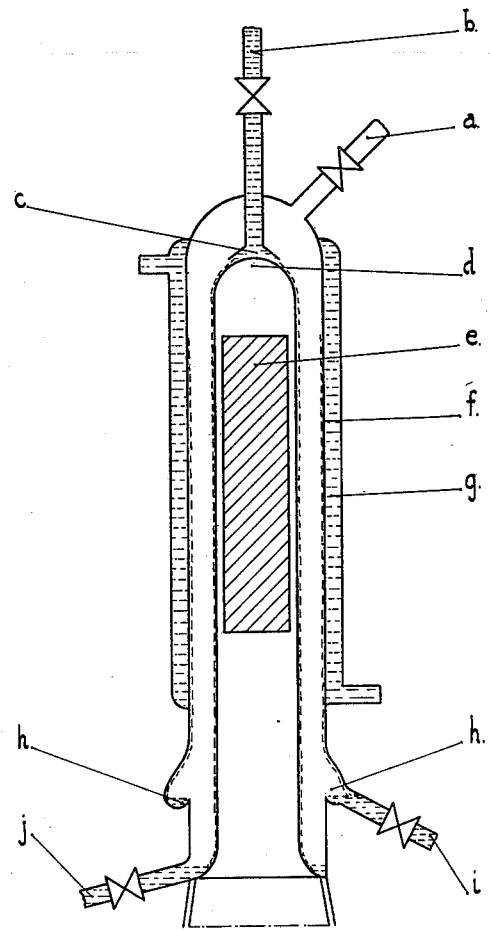
INVENTORS
D. Oosterhof,
C. v. Vlodrop,
H. I. Waterman,
BY K. P. McElroy
ATTORNEY.

Patented Dec. 29, 1936

2,065,728

UNITED STATES PATENT OFFICE 2,065,728

PROCESS FOR REMOVING LOW MOLECULAR GLYCERIDES FROM POLYMERIZED OILS BY DISTILLATION

Dirk Oosterhof, Haarlem, Cornelis van Vlodrop, Rotterdam, and Hein Israel Waterman, Delft, Netherlands, assignors to Imperial Chemical Industries Limited, a corporation of Great Britain Application December 16, 1933, Serial No. 702,808
In the Netherlands December 20, 1932

10 Claims. (Cl. 87—12)

The invention relates to a process of eliminating low molecular constituents, including unpolymerized oil, from heavy bodied oils obtained by the polymerization of drying oils, such as linseed oil, China-wood oil, Perilla oil, Sterculia oil, soya bean oil and the like; and to products thereof and apparatus therefor.

The thickened oils which are treated according to the invention may have been solely polymerized (so-called stand oils) or they may also have undergone some other treatment, for example, oxidation (so-called blown oil).

The process is applicable to drying oils polymerized to any desired degree, but we prefer, of course, to use an oil, in which by heat treatment, gas-treatment or other polymerization process the proportion of unpolymerized substance has been reduced as far as possible.

The polymerization can be carried out in the well-known manner, for example by heating the drying oils, whether or not in the presence of catalysts, to a temperature of about 180–300° C. and keeping them for some time at a high temperature, preferably without access of air, for example by leading an inert gas such as carbonic acid or nitrogen through or over the product, or by carrying out the reaction in a vacuum.

In Dutch Patent No. 27,446 there is disclosed a process for improving stand oils by effecting a partial separation of polymerized constituents from unpolymerized constituents and free fatty acids, with the aid of solvents such as malonic esters. For example, a linseed stand oil is mixed with a malonic ester under heat, and solution takes place. On cooling, there separates out a "coarsely dispersed phase", containing most of the polymerized constituents, but also containing some of the unpolymerized material and some solvent. A "finely dispersed phase", containing most of the non-polymers, remains in solution in the solvent. Separation is only partial; as stated, the separated out coarse phase contains substantial amounts of non-polymers.

We have now found that a more nearly complete and much more convenient separation may be effected by purely physical means without the aid of solvents.

According to the invention we distill the polymerization products of drying oils, continuously if desired, under such a high vacuum, preferably a vacuum of the order of that known as a "cathodic vacuum", that not only the free fatty acids but also the low-molecular or non-polymerized glycerides are volatilized. In other words, the thickened oil is freed of residual, unthickened original oil. The distillate, which contains oil escaping polymerization in the original treatment, may be recycled, being sent back for admixture with other oils submitted to thickening.

This distillation makes it possible to eliminate the non-polymerized glycerides and the free fatty acids present, without losing valuable polymerized combinations at the same time from the reaction product. This is impossible with previously known methods of separation; when solvents are used, for example, there always remain polymerized products dissolved in, and carried away by, the solvent, distillation in ordinary vacua merely removes the more volatile free fatty acids.

The new method makes it possible to obtain the polymerized combinations without contaminating them with foreign substances, which might have a detrimental effect.

The distillation is carried out in an apparatus in which the condensation of the evaporated products is carried out at a short distance from the evaporating surface.

The process may aptly be termed "evaporative distillation." Evaporative distillation takes place when the vapor evolved from the surface of a liquid which is not in a state of ebullition is removed and condensed. The evolution of vapor is, of course, due to the "vapor pressure" of the liquid. When this vapor pressure (which increases with rise of temperature) is equal to the pressure on the liquid (in the case of an open vessel, atmospheric pressure), ebullition normally occurs. Any liquid, however, exerts a certain vapor pressure at any temperature, i. e., molecules of that liquid are always present in the vapor phase, their concentration therein depending on the temperature, and the pressure of gas in the liquid. If now a cold surface is placed in the gas phase, i. e., a surface cooled to a temperature at which the vapor pressure of the liquid is small compared to the vapor pressure at the temperature of the body of the liquid, then vapor molecules striking the cold surface condense and, owing to the difference of temperature, will not readily re-evaporate from the condensing surface. This is true evaporative distillation and may take place at any temperature and pressure provided the above conditions are satisfied.

At atmospheric or moderately reduced pressures the concentration of the molecules of the liquid in the vapor phase is generally small so that owing to the large number of collisions between the vapor molecules and the permanent gas molecules the rate of arrival of the vapor molecules at the cold surface is very small, and the rate of distillation is correspondingly small. The rate of distillation can only be increased by reducing the collisions between vapor and permanent gas molecules, and this is done by bringing the condensing surface into close proximity with the evaporating surface and working at extremely high vacua, that is pressures of the order of $10^{-6}$ mms. or less of mercury. Under these conditions the rate of evaporative distillation becomes very high.

Thus, when the condensing surface is approximately co-extensive with and in close proximity to (within a few inches of) the evaporating surface, the evaporative distillation becomes very efficient and approaches what may be termed "ideal distillation" (in which every molecule leaving the evaporating surface is caught and retained by the condensing surface so that the highest theoretically possible rate of distillation from a given surface area is attained.) Evaporative distillation under such conditions is known as "molecular distillation".

In evaporative distillation a high percentage (generally the greater proportion) of the molecules leaving the evaporating surface never return to it. Such a process is characterized by evaporating and condensing surfaces, substantially co-extensive, placed opposite one another at a distance which is small compared with the square root of the total area of evaporating and condensing surface. The process is in general carried out in a high vacuum e. g., of the order of a cathode tube vacuum which is, as shown in Mellor's Notebook-Molecular Chemistry 1925 Edition at page 1011, of the order of 3/100 mm. or less and if the vacuum is high enough and the distance between the surfaces is less than the mean free path of the distilling molecules the process is that known as "molecular distillation". Our process is, however, not limited to these latter conditions and is in practice an "evaporative" process which may or may not approach true "molecular distillation" according to the conditions of distillation and the nature of the distilling molecules. The mean free path is the mean distance a molecule of a gas moves between collisions as indicated by Clerk Maxwell in Philosophical Magazine 4th Series vol. 19, p. 28 (1860).

A device which has been found very suitable consists of two vertical concentrically placed pipes, in which the inner pipe is closed from above and is heated internally by electricity, whilst the outer pipe is cooled from outside. In the apparatus there is maintained a high vacuum by means, e. g. of mechanical pumps. By means of a feed pipe, stand oil is brought to the upper end of the internal tube, and the low molecular constituents evaporate on the heated part of the tube and condense upon the cooled outer pipe. If desired, the inner tube may be divided into a number of parts, each of which is to be heated separately to a certain temperature, the temperature increasing downwards. The outer tube is provided with one or more devices for draining off the distillate. The high molecular residue runs downwards along the inner tube and is collected from there.

With this continuous distillation process the oil is only exposed for a short time to a high temperature, thus preventing undesirable secondary reactions. With a stand oil, which is linseed oil bodied by heat treatment, it is in general undesirable to carry on the action for a substantial length of time, i. e., to expose it to a high temperature for a long time.

By making use of concentric pipes, of which the outer one serves as condensation surface, not only does the distance between the surfaces remain small, but the condensation surface has furthermore a larger surface than the evaporation surface, which causes a more rapid condensation, and thus a better evaporation. Furthermore, this shape is more resistant to a high vacuum than, for example, flat evaporation or condensation surfaces.

The improved polymerized drying oils produced by our process are viscous liquids of high viscosity e. g., of at least 100 and preferably of at least 300 poises and higher mean molecular e. g., of at least 2500 and preferably of at least 3000 weight than the polymerized oils from which they are derived. They dry much more rapidly, have a very low acid number, e. g., not exceeding about 3.0 and preferably not exceeding 2.5 and are more resistant to saponification. They are free of materials volatile under the conditions of evaporative distillation; that is, are free of unpolymerized constituents and free fatty acids which if present would have a dispersive or dissociative effect on the polymers. These improved properties make the products very valuable in the paint and varnish industry. Coating compositions, in which the new products are used in place of all or part of the stand oil commonly employed, dry rapidly to a hard uniform film. The new products have the further advantage over the ordinary polymerized oils, such as stand oil, that they remain clear even after prolonged storage.

By using in our process an oil of a low or moderate degree of polymerization, oils of correspondingly low or moderate viscosities (always however, greater than that of the starting materials) are obtainable.

The low molecular part of the polymerized oil which has been distilled off, consists often to a great extent of saturated fatty acids and saturated fatty acid glycerides, but it may also contain further constituents which may advantageously be polymerized again. It is therefore possible again to submit these low molecular constituents if desired with addition of further quantities of drying oils to a polymerization, and then to eliminate the low molecular constituents still remaining by means of distillation. The low molecular constituents removed by distillation may, for example, be employed in the manufacture of soap and similar industries.

The invention will be illustrated in more detail by way of example with reference to the apparatus shown on the accompanying drawing. This apparatus is first connected by means of a pipe (a) to a vacuum pump. It is evacuated as far as possible by mechanical means and then brought up to and kept at cathodic vacuum by means of adsorption carbon, cooled with liquid air. The oil is fed from an evaporating reservoir through a pipe (b), and distributed by means of a spreading device (c) over the upper end of pipe (d), the pipe being heated internally by means of an electric heating element (e). Whilst the oil runs downwards along the pipe (d), the temperature of the oil has already increased in the part above the heating element (e), during which process certain vaporized gases and volatile substances escape from the oil. On the heated part of the pipe (d) the low molecular constituents evaporate out of the oil film which is moving downwards, and condense upon the pipe (f). Pipe (f) is kept at a low temperature by means of a cooling jacket (g). The distillate which has been formed is collected in a ring-shaped gutter (h), and drained off through pipe (i). The high molecular residue flows along pipe (d) downwards and is drained off through pipe (j).

In this manner we have treated, for example a stand oil obtained from linseed oil and having an iodine value (Wijs) of 124.

The oil obtained by polymerization, was subjected, while still warm, to an immediate distillation, thereby securing a certain economy in heat. The result of distillation in the apparatus above described was expressed in per cent by weight of the original material, 66.2 per cent high molecular residue, and 30.7 per cent low molecular distillate. The first distillate and the loss amounted to 3.1 per cent. The residue and the distillate obtained were, like the original material, of clear yellow color. The distillate after standing for a day showed a strong turbidity, but the residue remained completely clear after standing for two months.

In the following table we give some characteristics of the original material and the products derived from the same.

|  | Stand oil | Residue | Distillate | Residue and distillate mixed in usual proportions |
|---|---|---|---|---|
| Viscosity in poises | 55.2 | 379.0 | 1.51 |  |
| $n_D^{20°}$ | 1.4908 | 1.4957 | 1.4806 | 1.4909 |
| $d_4^{20°}$ | 0.9622 | 0.9756 | 0.9362 | 0.9630 |
| Acid number | 7.3 | 1.5 | 19.4 | 7.1 |
| Average mol. wt. | 1610 | 3463 | 757 | 1926 |

In the above table $$n_D^{20°}$$

represents the refractive index at 20° C. for the D sodium line, and $$d_4^{20°}$$

refers to the density of the material at 20° C. referred to water at 4° C. as unity.

In examining the viscosity of the various products, it appears that by elimination of the least viscous constituents of the stand oil in the form of distillate, a residue of very high viscosity is obtained, and even of a higher viscosity than may be expected from the quantities of residue and distillate and their respective viscosities. It can further be seen from this table that the distillation has been carried out without a noticeable degradation.

In another example a "bodied" linseed oil was prepared by heating raw linseed oil at 285–290° C. at 2-3 mm. pressure for 9 hours. The bodied oil had a viscosity of 37-38 poises at 25° C. and an acid number of 5.4. It was distilled at a pressure of about $10^{-5}$ mm., the evaporating surface being heated to about 200–250° C. Distillation took place without ebullition and was continued until about 20–30% by weight of the material had condensed as distillate.

The undistilled residue was mixed with 1.1 per cent of cobalt as cobalt linoleate, and the resulting varnish was tested by brushing on panels in the customary manner. The following results were obtained (those with the bodied oil starting material are added for comparison).

|  | Surface set after | Surface after 24 hours |
|---|---|---|
| Bodied oil, residue after distilling off 20%. | 3–3½ hrs. | Hard and not tacky. |
| Bodied oil residue after distilling off 30%. | 3½–4 hrs. | Hard and not tacky. |
| Bodied oil (original). | 8–24 hrs. | Soft and tacky. |

We claim:

1. In a process for the preparation of an improved polymerized drying oil, the step which comprises removing volatile matter including low molecular weight glycerides from a polymerized drying oil by exposing the same to evaporative distillation in a high vacuum, approximately of the order of the cathodic vacuum, at a temperature sufficient to vaporize and eliminate unpolymerized oil as well as free fatty acids.

2. In a process for the preparation of an improved polymerized drying oil, the step which comprises removing volatile matter including low molecular weight glycerides from a polymerized drying oil by evaporative distillation in a vacuum of the order of a cathode tube vacuum.

3. In a process for the preparation of an improved polymerized drying oil, the step which comprises removing volatile matter including low molecular weight glycerides from a polymerized drying oil by molecular distillation in a vacuum of the order of a cathode tube vacuum.

4. Process for the preparation of improved polymerized drying oils of acid value not greater than 3, mean molecular weight of at least 3,000, and viscosity of at least 300 poises, which comprises passing a polymerized drying oil thru a distilling apparatus exhausted to a vacuum of the order of a cathode tube vacuum, and distilling therein until substantially all the fatty acids and substantially all unpolymerized glycerides are removed from the polymerized drying oil, and collecting the residual oil.

5. Process for the preparation of improved polymerized drying oils of acid value not greater than 3, mean molecular weight of at least 3,000, and viscosity of at least 300 poises, which comprises passing a polymerized drying oil thru a distilling apparatus exhausted to a vacuum equivalent to a pressure of not over three hundredths of a millimeter of mercury, and distilling therein until substantially all the fatty acids and substantially all unpolymerized glycerides are removed from the polymerized drying oil, and collecting the residual oil.

6. Process for the preparation of improved polymerized linseed oil of acid value not greater than 3, mean molecular weight of at least 3,000, and viscosity of at least 300 poises, which comprises passing bodied linseed oil thru a distilling apparatus, the evaporating surface of which is heated to about 200° to 250° C., said apparatus being exhausted to a vacuum of about $10^{-5}$ mm., and distilling therein until substantially all the fatty acids and substantially all unpolymerized glycerides are removed from the polymerized linseed oil, and collecting the residual oil.

7. In a process for the preparation of an improved polymerized drying oil, the step which comprises subjecting a polymerized drying oil to evaporative distillation at an elevated temperature in a high vacuum approximately of the order of the cathodic vacuum between a heated distilling surface and a cooled condensing surface in close proximity, the degree of vacuum, temperature and time being sufficient to cause distillation of volatile matter including free fatty acids and low molecular weight glycerides from the oil, leaving a residue substantially composed of polymerized oil.

8. In a process for the preparation of an improved polymerized drying oil, the step which comprises flowing a polymerized drying oil over a hot surface in close proximity to a cooled condensing surface under a high vacuum approximately of the order of the cathodic vacuum and at such temperature and for such length of time as to cause evaporation of volatile matter including low molecular weight glycerides and free fatty acids, yielding as a residue the polymerized constituent of the starting material.

9. In a process for the preparation of an improved polymerized drying oil, the step which comprises removing volatile matter including low molecular weight glycerides from a polymerized drying oil by exposing such oil to distillation from a heated surface to a cooled surface in close proximity thereto under a vacuum of the order of a cathode tube vacuum.

10. In a process for the preparation of an improved polymerized drying oil, the step which comprises flowing a polymerized drying oil over a heated surface in close proximity to a cooled condensing surface concentric with the heated surface under a vacuum of the order of a cathode tube vacuum, to yield as a residue the polymer constituent of the starting material.

DIRK OOSTERHOF.
CORNELIS van VLODROP.
HEIN ISRAEL WATERMAN.

CERTIFICATE OF CORRECTION.

Patent No. 2,065,728.

December 29, 1

DIRK OOSTERHOF, ET AL.

It is hereby certified that error appears in the printed specification o the above numbered patent requiring correction as follows: Page 2, second column, line 23, strike out the word "weight" and insert the same after "molecular" in line 22; page 3, first column, line 41, in the table, and line 51 insert a degree mark ° after the numeral "4"; and that the said Letters Patent should be read with these corrections therein that the same may conform to the record of the case in the Patent Office.

Signed and sealed this 23rd day of February, A.D. 1937.

(Seal)

Henry Van Arsdale
Acting Commissioner of Patents.

CERTIFICATE OF CORRECTION.

Patent No. 2,065,728.　　　　　　　　　　　　　　　　December 29, 193̶

DIRK OOSTERHOF, ET AL.

It is hereby certified that error appears in the printed specification of the above numbered patent requiring correction as follows: Page 2, second column, line 23, strike out the word "weight" and insert the same after "molecular" in line 22; page 3, first column, line 41, in the table, and line 51 insert a degree mark ° after the numeral "4"; and that the said Letters Patent should be read with these corrections therein that the same may conform to the record of the case in the Patent Office.

Signed and sealed this 23rd day of February, A.D. 1937.

(Seal)

Henry Van Arsdale
Acting Commissioner of Patents.